US008447651B1

(12) United States Patent
Scholl et al.

(10) Patent No.: US 8,447,651 B1
(45) Date of Patent: May 21, 2013

(54) BIDDING ON PENDING, QUERY TERM-BASED ADVERTISING OPPORTUNITIES

(75) Inventors: Nathaniel B. Scholl, Seattle, WA (US); Stephan G. Betz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1488 days.

(21) Appl. No.: 11/043,503

(22) Filed: Jan. 25, 2005

Related U.S. Application Data

(63) Continuation of application No. 10/926,834, filed on Aug. 25, 2004, now abandoned.

(51) Int. Cl.
*G06Q 30/00* (2012.01)

(52) U.S. Cl.
USPC ...................................... 705/14.54; 705/14.4

(58) Field of Classification Search
USPC ........................................................... 705/14
See application file for complete search history.

(56) References Cited

U.S. PATENT DOCUMENTS

| 6,078,866 | A | * | 6/2000 | Buck et al. ........................ 702/2 |
| 6,269,361 | B1 | * | 7/2001 | Davis et al. ....................... 707/3 |
| 6,826,572 | B2 | * | 11/2004 | Colace et al. .................... 707/10 |
| 6,978,263 | B2 | * | 12/2005 | Soulanille .......................... 707/3 |
| 7,043,450 | B2 | * | 5/2006 | Velez et al. ....................... 705/37 |
| 2004/0133469 | A1 | * | 7/2004 | Chang .............................. 705/14 |
| 2004/0162757 | A1 | * | 8/2004 | Pisaris-Henderson et al. . 705/14 |
| 2005/0137939 | A1 | * | 6/2005 | Calabria et al. ................. 705/26 |
| 2005/0144068 | A1 | * | 6/2005 | Calabria et al. ................. 705/14 |
| 2005/0160002 | A1 | * | 7/2005 | Roetter et al. .................. 705/14 |
| 2005/0216335 | A1 |   | 9/2005 | Fikes et al. |

FOREIGN PATENT DOCUMENTS

WO WO98/34189 8/1998

* cited by examiner

*Primary Examiner* — Yehdega Retta
(74) *Attorney, Agent, or Firm* — Novak Druce Connolly Bove + Quigg LLP

(57) ABSTRACT

A facility for bidding on a pending advertising opportunity is described. The facility receives at an advertiser a notification from a publisher. The notification contains keywords relating to a content request received by the publisher, and is sent by the publisher between its receipt of the content request and its dispatch of a content response responsive to the content request. In response to receiving the notification, the facility sends to the publisher a dynamic bid. The dynamic bid specifies an advertising message and a bid amount that the advertiser is willing to pay to present the advertising message in connection with a content response responsive to the content request produced by the publisher.

52 Claims, 6 Drawing Sheets

BIDDING ON PENDING, QUERY TERM-BASED ADVERTISING OPPORTUNITIES

CROSS-REFERENCE TO RELATED APPLICATION(S)

This application is a continuation of U.S. patent application Ser. No. 10/926,834 entitled "BIDDING ON PENDING, QUERY TERM-BASED ADVERTISING OPPORTUNITIES," filed on Aug. 25, 2004 now abandoned, which application is hereby incorporated by reference in its entirety.

TECHNICAL FIELD

The present invention is directed to the field of on-line advertising, and, more particularly, to the field of techniques for bidding on on-line advertising opportunities.

BACKGROUND

Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms.

To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books.

When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results."

An advertiser who wants to place an advertisement along with certain search results provides a search engine service with a prospective advertising bid. Typical prospective advertising bids include (1) one or more search terms, (2) a bid amount, and (3) an advertising message. When a search request is received from a user, the search engine service identifies one or more of the already-received prospective advertising bids meeting certain criteria, such as those having the highest bid amounts among those including matching search terms, or those having the highest expected value among those including matching search terms. The engine service returns a search result in response to the received search request that includes the advertising messages of each of the identified prospective advertising bids. This search result, together with the included advertising messages, is displayed to the user.

Bidding on search result advertising opportunities using prospective advertising bids have a number of disadvantages for advertisers. First, it often requires a great deal of ongoing effort for an advertiser to select search terms and optimize its bids for these search terms. Second, there tends to be a practical limit to the number of search terms for which an advertiser can maintain prospective advertising bids. As a result, an advertiser often must forgo a large group of search terms, even though (1) the advertiser fully expects them to be included in one or more search queries received by a typical search engine and (2) the advertiser could benefit from bidding on them, because the overhead of bidding on them is too high relative to the likely benefit. Third, to effectively use prospective advertising bids, an advertiser must to be able to anticipate search terms that will be included in future search queries. If search engines receive a large number of queries including unexpected search terms, such as search terms relating to a news story or new product announcement, it can take an advertiser a substantial period of time to respond by submitting prospective advertising bids for these search terms, causing the advertiser to miss out on a substantial number of advertising opportunities. Fourth, prospective advertising bids typically do a poor job of differentiating between individual advertising opportunities in which the query contains the same search term, such as search requests received from different individual users, some of whom are good prospects and other of whom are poor prospects; search requests received on different days or at different times; search requests specifying different combinations of search terms; search requests including particular query constructs, such as Boolean operators; search requests received at a time when an advertised item is out of stock; etc.

An approach to seeking search result advertising opportunities that overcame some or all of these disadvantages of prospective advertising bids would have significant utility.

DETAILED DESCRIPTION

Figure 1:
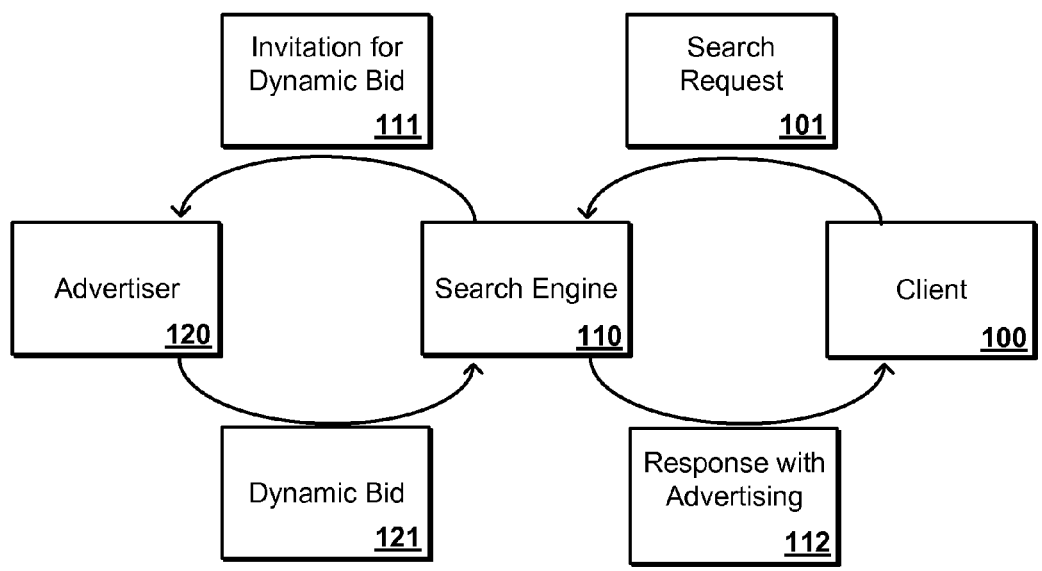
FIG. 1 is a data flow diagram showing a typical data flow performed in accordance with the facility.

A software facility to support bidding on pending query-based advertising opportunities is described. In accordance with the facility, when a search engine receives a search request containing a search query—the search engine sends an invitation for dynamic bid containing a set of keywords from the search query to one or more advertisers. When an advertiser receives an invitation, the advertiser analyzes the keywords, and determines whether it wishes to submit a dynamic bid to include an advertising message in the search result returned by the search engine in response to the query. If so, the advertiser responds to the notification with a dynamic bid specifying a bid amount and an advertising message. If the search engine accepts the dynamic bid, it includes the specified advertising message in the search result returned by the search engine in response to the query.

In some embodiments, the advertiser considers an invitation for dynamic bid by applying the keywords against its own item catalog or other database of advertising subject information to identify an item or a category of items that can be purchased or otherwise obtained from the advertiser and that relate to the search query. In some embodiments, the facility constructs a custom advertising message featuring the identified item or category that is specifically responsive to the notification, such as the time at which it is received, the language in which the search query is expressed, information about the user's identity or characteristics, information about the amounts of already-known bids, etc. In some embodiments, the facility selects a bid amount based upon the profitability of the item, the historical effectiveness of advertising on the notifying search engine, information about the user's identity or characteristics, etc.

In some embodiments, a single search engine can send a notification of a single search request to multiple advertisers. In some embodiments, search engines receive search requests from users via an intermediate search engine user interface, and/or return search responses to users via a search engine user interface. In some embodiments, a single advertiser can register to receive notifications from multiple search engines.

In some embodiments, the search engine can compare a bid received in response to a notification against (1) other bids received in response to the same notification, (2) other cached bids received in response to earlier notifications having similar queries, (3) earlier-received conventional prospective bids, or any combination thereof. In some embodiments, the facility enables an advertiser to invalidate one or more of its cached bids before they expire.

In some embodiments, advertisers can provide criteria in advance about the kinds of search requests for which they wish to receive invitations, such as advertiser-side "stop words" that, if they appear in a search query, should prevent a notification from being sent to a particular advertiser. As another example, an advertiser can specify to receive invitations for particular types of search requests received at the search engine, such as product price searches. In some embodiments, search engines can provide criteria in advance about the kinds of search requests for which the search engine will send invitations to all advertisers or individual advertisers, such as search engine-side stop words that, if they appear in a search query, should prevent a notification from being sent to selected advertisers or all advertisers. In some embodiments, search engines include additional information in the notifications to assist the advertisers in the decisions of whether to bid, the amount to bid, what to advertise, how to construct the advertising message, etc. In some embodiments, an advertiser can include in its response an indication that its bid should be cached by the search engine for a certain period of time, in order to reduce the overhead to the search engine and advertiser of communicating in response to every search request.

By facilitating bidding on pending query-based advertising opportunities in some or all of the ways described above, the facility enables advertisers to more effectively use query-based advertising. Also, the facility may enable a search engine to reduce its level of overhead for query-based advertising, increase revenues from query-based advertising, and/or make query-based advertising messages more relevant to and appreciated by its users.

FIG. 1 is a data flow diagram showing a typical data flow performed in accordance with the facility. A client computer system 100 sends a search request 101 to a search engine computer system 110. Table 1 below shows a sample search request.

TABLE 1

| | |
|---|---|
| sender IP address: | 192.0.34.166 |
| sender cookie: | 07351928 |
| query: | insulated squeeze bottle |

The sample search request includes a sender IP address of the client computer system, a cookie stored for the search engine domain on the client computer system, and a search query. Those skilled in the art will appreciate that the sample search request shown in Table 1 above, as well as the data structures shown in additional tables below, are merely exemplary, and that embodiments of the facility may use corresponding data structures having more, less, or different content, organized, formatted, and/or encoded in various ways. In particular, certain data items shown may be optional to provide, or universally excluded.

The search engine computer system in turn sends an invitation for dynamic bid 111—also called "search notification"—to an advertiser computer system 120. In some embodiments, the search engine computer system may send invitations corresponding to the search request to the advertiser computer systems of multiple advertisers. In some embodiments, the search engine computer systems of multiple search engines may send search invitations to the same advertiser computer system. A sample invitation for dynamic bid is shown below in Table 2.

TABLE 2

| | |
|---|---|
| publisher ID: | 024 |
| notification ID: | 273692 |
| present high bid: | $0.05 |
| profile: interest: | oceanography |
| sender IP address: | 192.0.34.167 |
| sender cookie: | 07351928 |
| query: | insulated squeeze bottle |

In addition to the information in the sample search request, the sample search notification includes a publisher ID identifying the publisher sending the notification, a notification ID identifying the notification, an indication of the present high bid to advertise in the result for the search request, and profile information retrieved by the search engine using the sender IP address and/or the sender cookie.

In some cases, in response to the search notification, the advertiser computer system sends the search engine computer system a notification response—also called a "dynamic bid"—121 containing a bid for including an advertising message in a search result generated for the client computer system by the search engine computer system. Table 3 below shows a sample notification response.

TABLE 3

| | |
|---|---|
| advertiser ID: | 1129 |
| bid ID: | 4697324 |
| notification ID: | 273692 |
| bid amount: | $0.15 |
| cache period: | 7 days |
| advertising message: | <advertising message> |
| hyperlink: | http://www.example.com/item297432.asp |

The sample notification response includes an advertiser ID identifying the advertiser, a bid ID identifying the bid represented by the notification response, a bid amount, a period for which the bid is to be cached by the search engine, an advertising message, and a hyperlink that is to be traversed if the user clicks on the advertising message.

Based in part on the notification response, the search engine computer system composes a search result web page 112—also called a "search response"—potentially including an advertising message specified by the bid in the notification response. This search result is returned to the client computer system for display. Table 4 below shows a sample search response.

TABLE 4

| |
|---|
| <search result> |
| <advertising message> |
| http://www.example.com/item297432.asp |

The sample search response includes a search result, the advertising message, and the hyperlink.

While various functionalities and data are shown in FIG. 1—and in FIG. 7, discussed below—as residing on particular computer systems that are arranged in a particular way, those skilled in the art will appreciate that such functionalities and data may be distributed in various other ways across computer systems in different arrangements.

Figure 2:
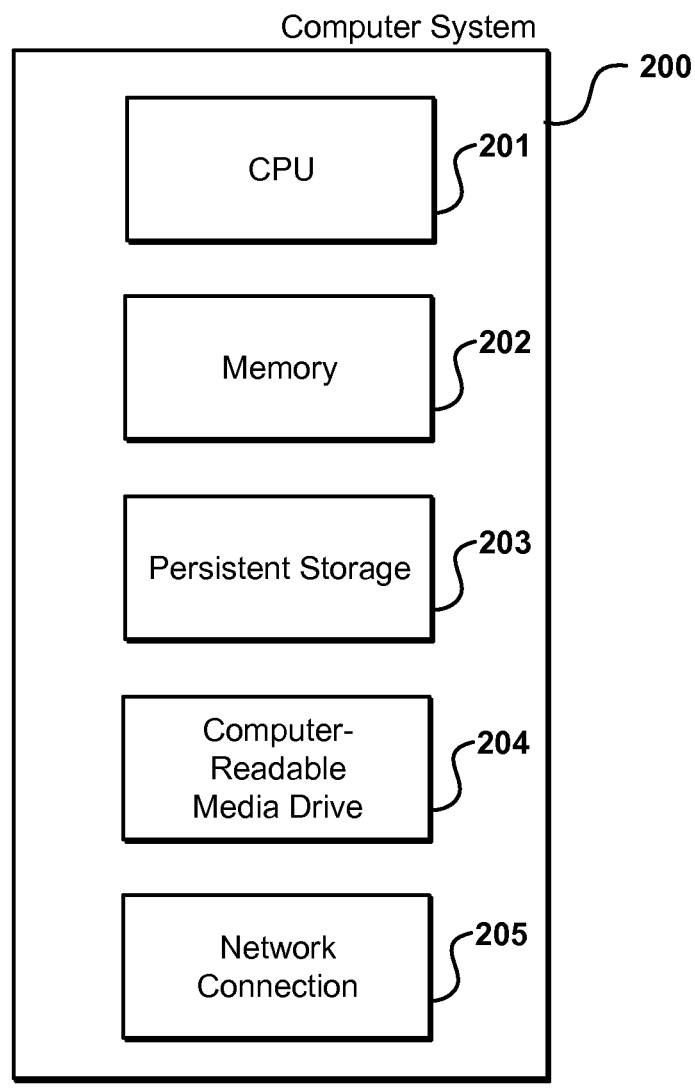
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 3:
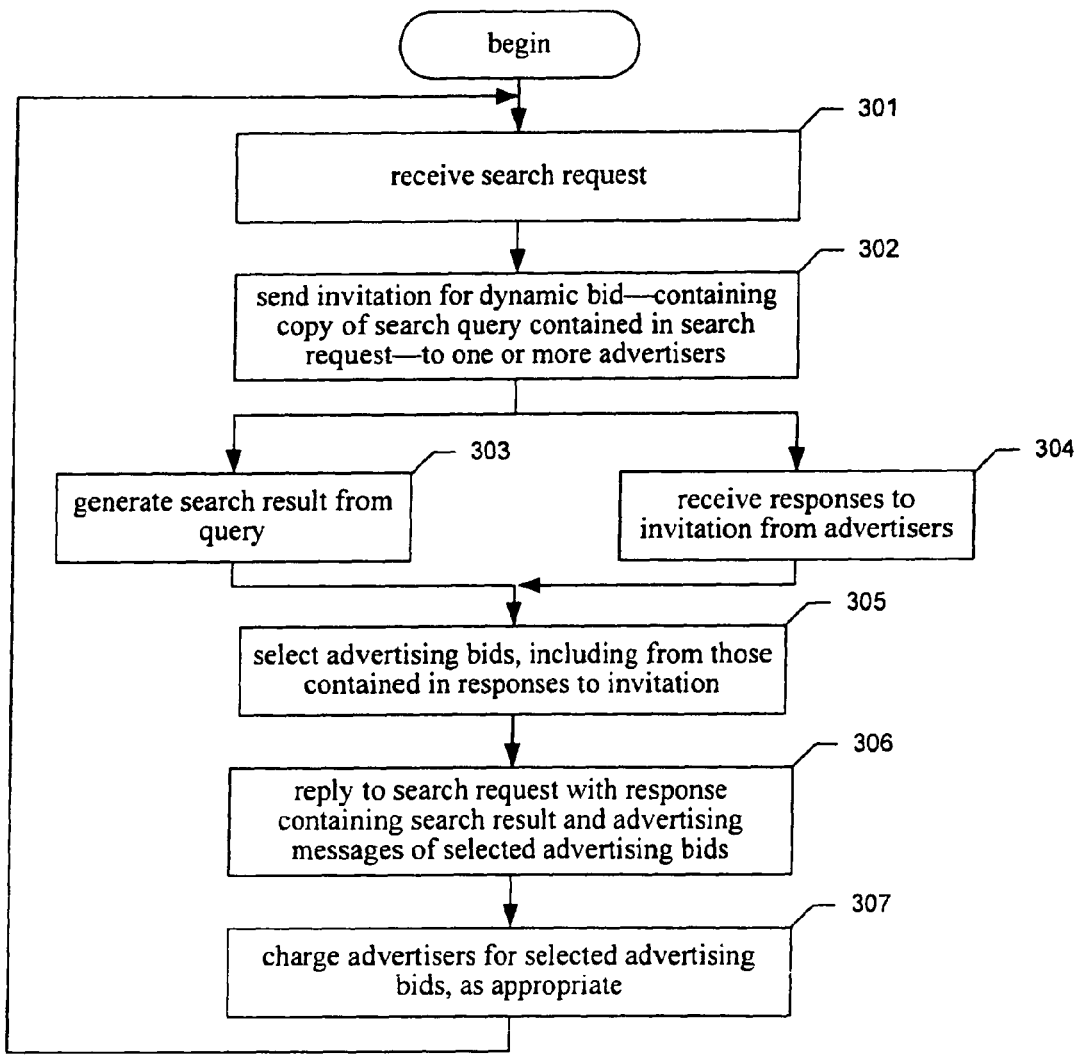
FIG. 3 is a flow diagram showing steps typically performed by the facility to process a search request.

FIG. 3 is a flow diagram showing steps typically performed by the facility to process a search request. These steps are typically performed by the facility in the search engine computer system. In step 301, the facility receives the search request from the client computer system. In step 302, the facility sends an invitation for dynamic bid on the search request received in step 301 to one or more advertisers. The sent invitations each contain a copy of the search query contained in the search request. In some embodiments, the facility uses a "stop list" of search terms specified by each advertiser that, if they occur in a search query, should preclude the sending of an invitation to the advertiser. In some embodiments, the facility uses a similar list of search terms specified by each advertiser that, when they appear in queries, should cause an invitation to be sent to the advertiser. In some embodiments, the facility uses an indication of types of queries specified by each advertiser that causes an invitation for dynamic bid to be sent to the advertiser only for queries of these types. In some embodiments, the facility uses a stop list or other control mechanism specified by the search engine to determine whether selected or all advertisers receive invitations for dynamic bid for particular queries. In some embodiments, before sending an invitation to a particular advertiser in step 302, the facility checks a cache of dynamic bids earlier submitted by the advertiser that may match the current search query. If an unexpired cached dynamic bid matches the current search query, the facility omits to send an invitation to the advertiser in step 302, and rather uses the cached dynamic bid for that advertiser. In some embodiments, where the facility uses a cached dynamic bid, the search engine asynchronously notifies the advertiser that the cached dynamic bid was used.

After step 302, the facility performs steps 303 and 304 in parallel. In step 303, the facility generates a search result based upon the query contained in the search request. in step 304, the facility receives dynamic bids in response to the invitation sent in step 302 from advertisers. Where a response to the invitation received in step 304 from a particular advertiser specifies that the contained dynamic bid be cached by the search engine, this dynamic is added to a dynamic bid cache maintained by the search engine. In some embodiments, an advertiser-specified caching duration or a default caching duration is used to determine how long a cached dynamic bid will remain in the cache. In some embodiments (now shown), the facility enables advertisers to send instructions to the search engine to invalidate one or more dynamic bids before their caching durations elapse.

After performing steps 303 and 304, the facility continues in step 305. In step 305, the facility selects one or more advertising bids for inclusion with the search result. The selected advertising bids may be among the bids received in the responses to the notification, cached bids from responses to earlier notifications, and/or earlier-received prospective bids. Bids may be selected in a variety of ways, such as by highest bid amount, highest expected value based upon bid amount and historical performance of advertising messages from each advertiser, etc. In step 306, the facility replies to the search request received in step 301 with a response containing the search result generated in step 303 and the advertising messages specified by the advertising bids selected in step 305. In step 307, the facility charges the advertisers for the selected advertising bids, as appropriate. For example, for bids specifying an amount for the presentation of an advertising message, advertisers are billed immediately. For bids specifying an amount for a click-through from a presented advertising message, the advertiser is charged if and when the presented advertising message is clicked-through. In some embodiments, the facility also notifies advertisers sending dynamic bids of the outcome of the auction, such as by indicating whether the advertiser's bid won the auction, or by providing information about the winning bid or bids. After step 307, the facility continues in step 301 to receive the next search request.

Figure 4:
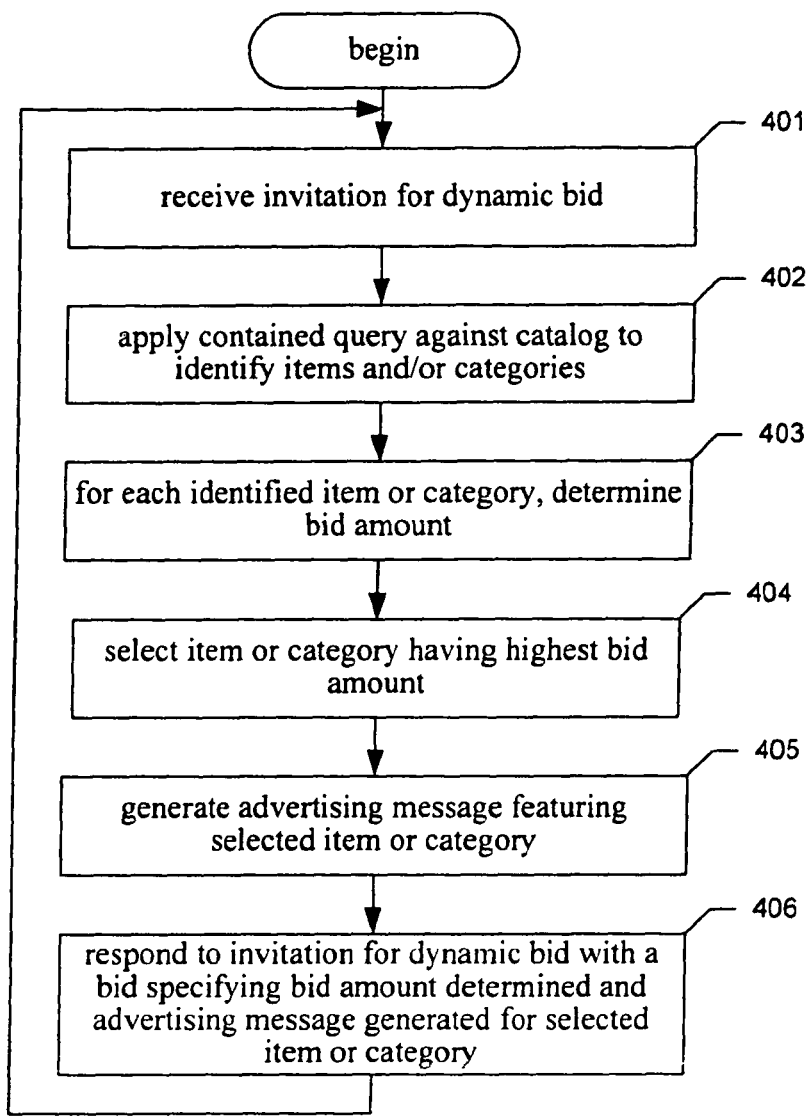
FIG. 4 is a flow diagram showing steps typically performed by the facility in the advertising computer system to process a search request notification.

FIG. 4 is a flow diagram showing steps typically performed by the facility in the advertising computer system to process a search request notification. In step 401, the facility receives an invitation for dynamic bid from a search engine computer system. In step 402, the facility applies the query contained in the invitation for dynamic bid received in step 401 against advertising subject database used by the advertiser. For example, where the advertiser is a merchant, the facility may apply the query against a catalog of items available from the merchant and/or categories thereof to identify items and/or categories to which the query relates. As another example, the facility may apply the query against a list of user wish lists established with a merchant by users. As another example, the facility could consider the seasonality of items or categories matching the query. In some embodiments, the facility applies the query using query operators included in the query, and/or query fields specified for query terms included in the query. In some embodiments, the facility applies the query in a manner that is based upon a type specified for the query, such as an image query, a product price query, etc. In some embodiments, where large number of different items are identified as matching the query, the facility may choose to advertise a category of items rather than an individual item.

In step 403, the facility determines a bid amount for each item or category identified in step 402. The facility may use a wide variety of approaches to determining a bid amount for an item or category. For example, bid amount can be based upon a computation of expected value of placing the advertising message, such as the item or category's margin, conversion-adjusted margin, time-based promotion status, inventory level, seasonality, etc. A bid amount may also be based upon competitiveness and/or budgetary considerations. Some techniques used by embodiments of the facility are described in one or more of the following: U.S. patent application Ser. No. 10/748,759, entitled METHOD AND SYSTEM FOR GENERATING AND PLACING KEYWORD-TARGETED ADVERTISEMENTS, filed on Dec. 30, 2003; U.S. patent application Ser. No. 10/914,722, filed on Aug. 9, 2004, entitled METHOD AND SYSTEM FOR IDENTIFYING KEYWORDS FOR USE IN PLACING KEYWORD-TARGETED ADVERTISEMENTS; and U.S. patent application Ser. No. 10/917,227, filed on Aug. 12, 2004, entitled METHOD AND SYSTEM FOR REDUCING BID AMOUNTS OF ADVERTISING BIDS, each of which is hereby incorporated by reference in its entirety.

In step 404, the facility selects the item or category having the highest bid amount, otherwise having the highest expected value, or best satisfying other criteria. In some embodiments, rather than determining the bid amount for each identified item or category in step 403, then selecting an item in step 404 as shown, the facility instead first selects an item or category, then determines a bid amount only for the selected item or category.

In step 405, the facility generates an advertising message featuring the selected item or category. In some embodiments, the facility uses an advertising message template to generate an advertising message, as discussed further below in conjunction with FIG. 6. In an alternative embodiment (not shown), the facility instead selects a pre-existing advertising message featuring the selected item or category. In step 406, the facility responds to the invitation for dynamic bid with a dynamic bid that specifies the bid amount determined for the selected item or category in step 403 and the advertising message generated for the selected item or category in step 405. In some embodiments, the dynamic bid further specifies a hyperlink, such as a URL, that the user will traverse if the user clicks on the advertising message or a portion thereof. As examples, the hyperlink may lead to a product or other item, a product or item group, a search of products, items, or groups, etc. After step 406, the facility continues in step 401 to receive the next search request notification.

Figure 5:
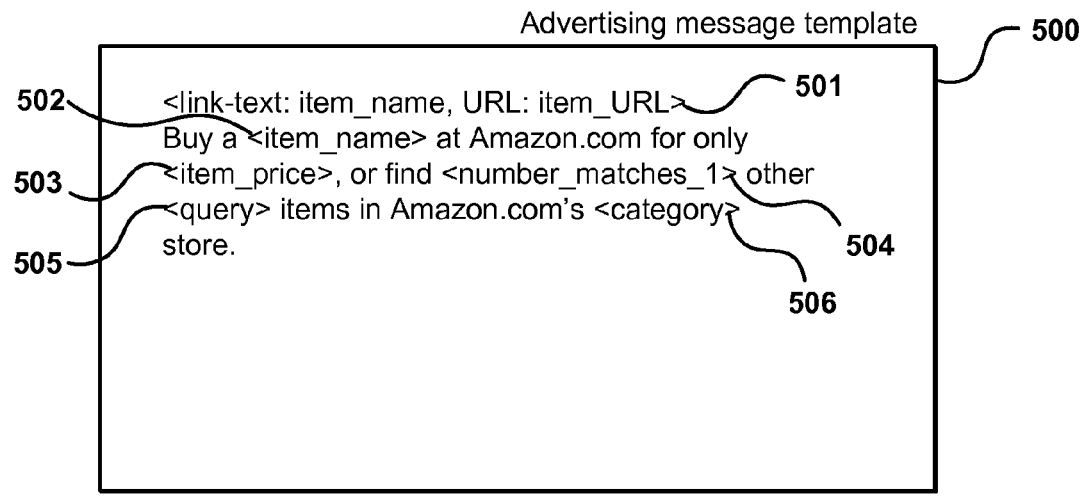
FIG. 5 is a data structure diagram showing a sample template used to generate a custom advertising message.

FIG. 5 is a data structure diagram showing a sample template used to generate a custom advertising message. The template 500 includes text, as well as substitution tags 501-506. In order to generate a custom advertising message from the advertising message template, the facility replaces each substitution tag with information specified by the substitution tag. Substitution tags may refer to, for example; information from the advertiser's catalog, some or all of the search query, contents of the notification other than the query, information looked up based upon contents of the notification (such as user profile information looked up based upon user identity or geographic location looked up based upon IP address), etc.

Figure 6:
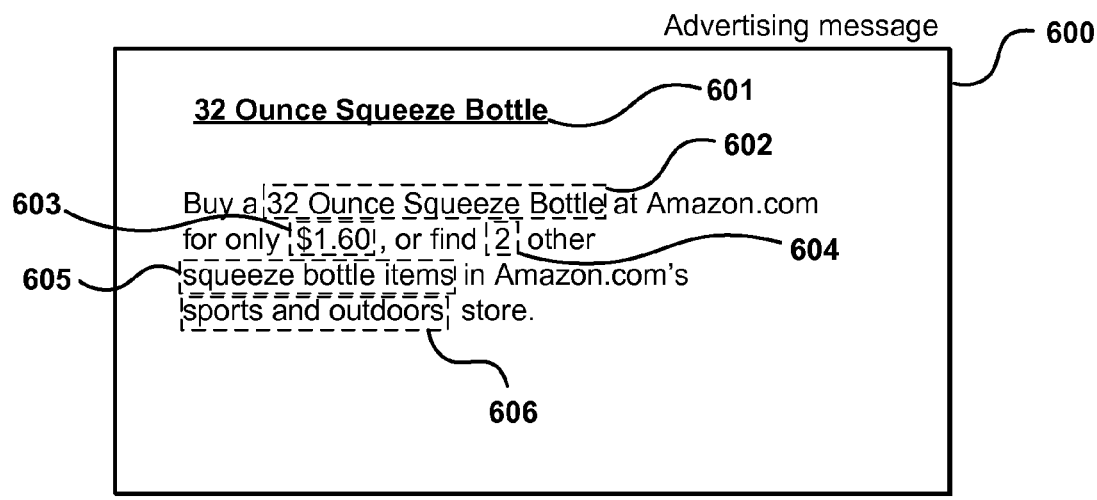
FIG. 6 is a data structure diagram showing an advertising message constructed using the advertising message template shown in FIG. 5.

FIG. 6 is a data structure diagram showing an advertising message constructed using the advertising message template shown in FIG. 5. It can be seen that link substitution tag 501, specifying a link name and a link URL, has been replaced with an actual link 601 in the advertising message having the specified text and URL. Substitution tags 502-506 have similarly been replaced with information they specify. In some embodiments (not shown), the substitution tags in a template may specify rich media elements, such as images, sounds, video, audio video, slide shows, etc. These rich media elements can be included in the corresponding advertising message either by value or by reference. The facility may select rich media elements from a supply of preexisting rich media elements, or dynamically compose or composite the rich media elements. The advertising message may be expressed in either textual or binary form.

Figure 7:
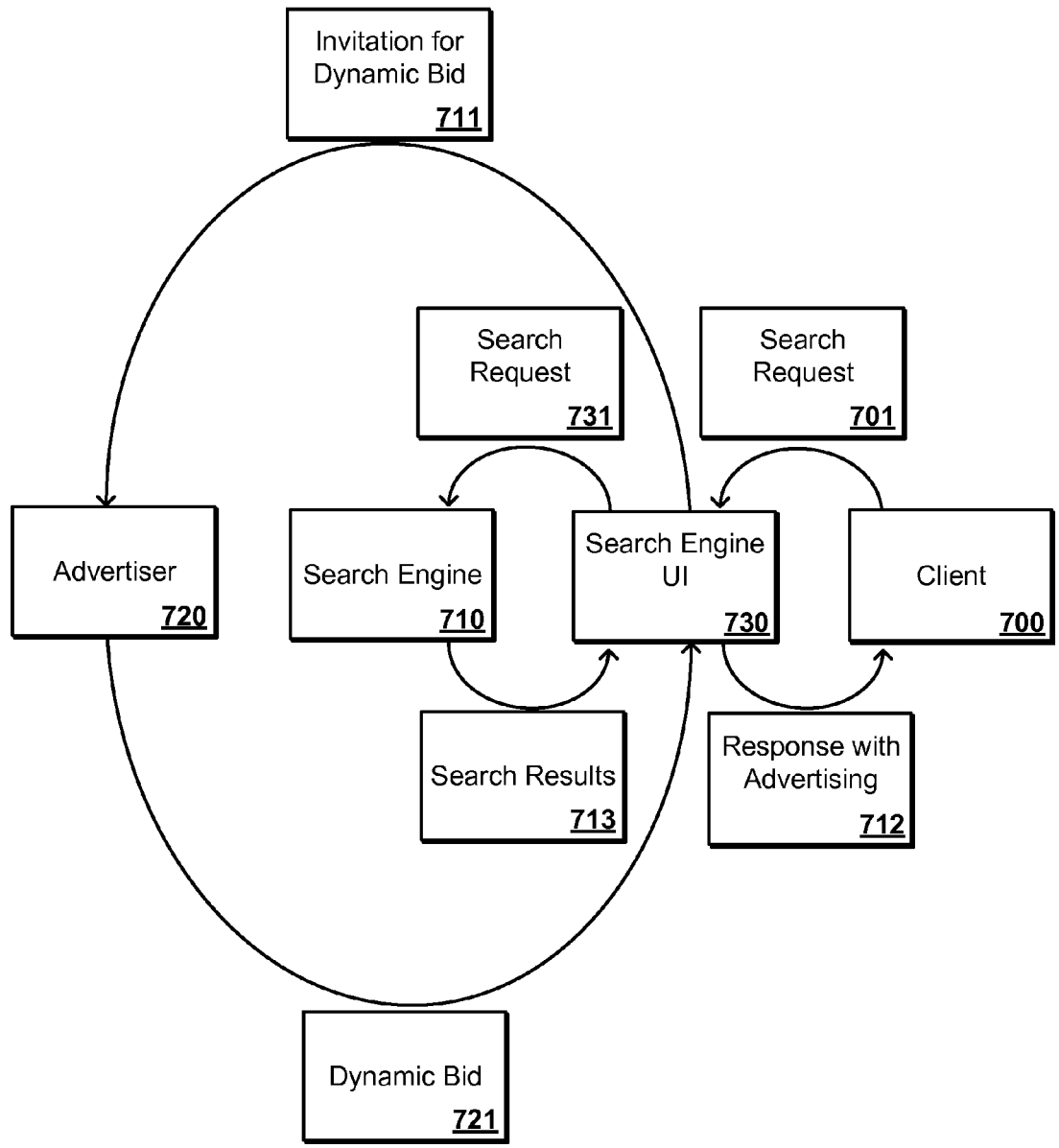
FIG. 7 is a data flow diagram showing an alternative typical data flow performed in accordance with the facility.

FIG. 7 is a data flow diagram showing an alternative typical data flow performed in accordance with the facility. The data flow shown in FIG. 7 is similar to that shown in FIG. 1, except that the initial search request 701 is submitted by the client computer system 700 to a search engine user interface computer system 730. This may occur, for instance, where a publisher offers searching services to its users, which it provides using a syndicated search service exposed via the search engine computer system. When the search engine user interface computer system receives the search request, it (a) forwards a copy 731 of the search request to the search engine to generate a search result, and (b) sends an invitation for dynamic bid 711 to the advertiser 720. The search request 731 sent from the search engine user interface computer system to the search engine computer system may be a copy of the search request 701 sent from the client computer system to the search engine user interface computer system, or may be derived from search request 701 in a variety of other ways.

In response to search request 731, the search engine computer system sends the search engine user interface computer system a search result 713 responsive to the search request. When the advertiser computer system receives the invitation for dynamic bid, it sends the dynamic bid 721 to the search engine user interface computer system. When the search engine user interface computer system receives the search result and dynamic bid, the search engine user interface computer system determines whether to accept the dynamic bid. If so, the advertising message specified by the dynamic bid is incorporated together with the search result in a search response 712 that is sent from the search engine user interface computer system to the client computer system.

In some embodiments—such as where an advertiser has prearranged a bid amount with the search engine—an advertiser may send a dynamic bid not explicitly specifying a bid amount. In some embodiments, the facility may send invitations for dynamic bids in response to receiving content requests other than search requests at a search engine or other publisher. In some embodiments, the facility sends invitations for dynamic bids containing sets of keywords other than copies of search queries, such as a proper subset of the keywords in a search query, a set of keywords derived from the keywords in a search query, or a set of keywords generated by parsing of body of text associated with the search request or other content request.

It will be appreciated by those skilled in the art that the above-described facility may be straightforwardly adapted or extended in various ways. For example, the facility may be used in conjunction with a wide variety of query types and query contents. The facility may use a variety of techniques to select items, item categories, or other subjects for advertising by the advertiser; to select and/or generate advertising messages; and to select bid amounts. The search engine may use a variety of techniques to select advertising bids, including advertising bids contained in live notification responses, cached notification responses, and earlier-received prospective advertising bids. While the foregoing description makes reference to preferred embodiments, the scope of the invention is defined solely by the claims that follow and the elements recited therein.

We claim:

1. A method in a computing system for bidding on a pending advertising opportunity, comprising:
   receiving at at least one advertiser computing device a notification from a publisher containing a search query received by the publisher, the notification being sent by the publisher between receipt of the search query by the publisher and dispatch of a search result responsive to the search query by the publisher;
   in response to receiving the notification, said at least one advertiser computing device:
      applying the search query against a database for the advertiser to identify items available from the advertiser relating to the search query;
      selecting one of the identified items to promote;
      designating an advertising message for the identified item;
      determining a bid amount; and
      sending to the publisher, prior to exhaustion of available advertising opportunities in connection with the search result, a dynamic bid for providing the designated advertising message in connection with the search result, the dynamic bid specifying the determined bid amount related to the designated advertising message.

2. The method of claim 1 wherein the search query is of a designated one of a plurality of types, and wherein the search query is applied against the database in a manner responsive to the designated type of the search query.

3. The method of claim 1 wherein the search query contains search terms specified for each of one or more identified fields, and wherein the search query is applied against the database in a manner responsive to which field each search term is specified for.

4. The method of claim 1 wherein the search query contains a query operator, and wherein the search query is applied against the database in a manner responsive to the identity or location of the query operator.

5. The method of claim 1 wherein the database against which the search query is applied contains, for at least a portion of the items having contents representable as text, a textual representation of the item contents.

6. The method of claim 1 wherein, if a large number of items are identified, selecting a category item with which at least a portion of the identified items are associated.

7. The method of claim 1, further comprising designating an advertising hyperlink for the identified item, and wherein the dynamic bid sent to the publisher further specifies the designated advertising hyperlink.

8. The method of claim 1 wherein the designated advertising message is textual.

9. The method of claim 1 wherein the designated advertising message is graphical.

10. A computer-readable medium whose contents cause a computing system to perform a method for bidding on a pending advertising opportunity, the method comprising:
   receiving at at least one advertiser computing device a notification from a publisher containing a search query received by the publisher, the notification being sent by the publisher between receipt of the search query by the publisher and dispatch by the publisher of a search result responsive to the search query; and
   using said at least one advertiser computing device:
      applying the search query against a catalog for the advertiser to identify items available from the advertiser relating to the search query;
      selecting one of the identified items to promote;
      designating an advertising message for the identified item;
      determining a bid amount; and
      sending to the publisher, prior to exhaustion of available advertising opportunities in connection with the search result, a dynamic bid for providing the designated advertising in connection with the search result, the dynamic bid specifying the designated advertising message and the determined bid amount.

11. A method in a computing system for bidding on a pending advertising opportunity, comprising:
   receiving at at least one advertiser computing device a notification from a publisher containing keywords relating to a content request received by the publisher between receipt of the content request by the publisher and dispatch by the publisher of a content response responsive to the content request; and
   in response to receiving the notification, sending to the publisher, prior to dispatch of the search result responsive to the content request, a dynamic bid specifying an advertising message and a bid amount that the advertiser is willing to pay to present the advertising message in connection with a content response responsive to the content request.

12. The method of claim 11 wherein the content request is a search query, and the content response contains a search result.

13. The method of claim 12 wherein the search query is constructed in a natural language, and wherein the advertising message is created using a template populated in a manner responsive to the natural language in which the search query is constructed.

14. The method of claim 12 wherein the search result contained by the content response is generated by the publisher.

15. The method of claim 12 wherein the search result contained by the content response is generated by a third-party search engine.

16. The method of claim 11 wherein the dynamic bid sent to the publisher further specifies an advertising hyperlink for the advertising message.

17. The method of claim 11 wherein a notification is received from the publisher via an intermediary, and wherein the dynamic bid is sent to the publisher via the intermediary.

18. The method of claim 11, further comprising determining the bid amount based upon an expected value to the advertiser of presenting the advertising message in connection with a content response responsive to the content request.

19. The method of claim 11 wherein the advertising message relates to a distinguished item, the method further comprising determining the bid amount based upon a profit margin associated with the distinguished item.

20. The method of claim 11 wherein the advertising message relates to a distinguished item, the method further comprising determining the bid amount based upon a profit margin associated with the distinguished item, adjusted by the likelihood that presenting the advertising message in connection with a content result responsive to the content request will cause a user viewing the content result to order the distinguished item from the advertiser.

21. The method of claim 11 wherein the advertising message relates to a distinguished item, the method further comprising determining the bid amount based upon a pending promotion for the item.

22. The method of claim 11 wherein the advertising message relates to a distinguished item, the method further comprising determining the bid amount based upon a level of inventory for the item.

23. The method of claim 11 wherein the advertising message relates to a distinguished item, the method further comprising determining the bid amount based upon seasonality information for the item.

24. The method of claim 11 wherein the advertising message relates to a distinguished item associated with a distinguished category, the method further comprising determining the bid amount based upon average profitability of advertising items in the distinguished category.

25. The method of claim 11 wherein the advertising message relates to a distinguished item associated with a distinguished category, the method further comprising determining the bid amount based upon information about competing bids.

26. The method of claim 25 wherein the received notification includes bid amounts for one or more pending bids, and wherein the bid amount is determined based upon the bid amounts for one or more pending bids included in the received notification.

27. The method of claim 11, further comprising determining the bid amount based upon advertising budget information of the advertiser.

28. The method of claim 11, further comprising selecting the advertising message specified by the dynamic bid from a plurality of existing advertising messages.

29. The method of claim 11, further comprising creating a custom advertising message that is specified by the dynamic bid.

30. The method of claim 29 wherein creating a custom advertising message comprises populating an advertising message template.

31. The method of claim 30 wherein the advertising message template is populated from a catalog maintained for the advertiser.

32. The method of claim 30 wherein the advertising message template is populated from the keywords.

33. The method of claim 30 wherein the advertising message template is populated from information other than the keywords contained in the notification.

34. The method of claim 30 wherein the advertising message template is populated using a user geographic location indication contained in the notification.

35. The method of claim 30, further comprising retrieving additional information based upon information other than the keywords contained in the notification, and
wherein the advertising message template is populated from the retrieved additional information.

36. The method of claim 35 wherein the retrieved additional information is user profile information retrieved based upon user identifying information contained in the notification.

37. The method of claim 35 wherein the retrieved additional information is geographic location information retrieved based upon a user network address contained in the notification.

38. A computing system for bidding on a pending advertising opportunity, comprising:
a receiver that receives at at least one advertiser computing device a notification from a publisher containing a search query received by the publisher, the notification being sent to the receiver and to a plurality of other receivers by the publisher between receipt of the search query by the publisher and dispatch of a search result by the publisher responsive to the search query; and
a sender that, in response to receiving the notification and prior to dispatch of the search result responsive to the query, sends to the publisher a dynamic bid specifying an advertising message and a bid amount that the advertiser is willing to pay to present the advertising message in connection with the search result responsive to the search query.

39. A data communications network comprising:
a plurality of computing devices conveying one or more generated data signals collectively conveying a dynamic bid data structure, said computing devices including an advertiser computing device operable to send the dynamic bid data structure to a publisher computing device of said plurality of computing devices that is adapted to receive the dynamic bid data structure, the dynamic bid data structure being generated by the advertiser computing system and comprising:
information specifying an advertising message, said advertising message stored in a computer readable medium accessible to one of said computing devices; and
an indication of a bid amount that the advertiser is willing to pay in order to present the specified advertising message with a search response to be sent in response to a search request that is pending at a search engine at the time of the generation of the dynamic bid data structure, said bid amount determined by said advertiser computing device based on the search request, the contents of the dynamic bid data structure being configured such that the publisher computing device receiving the dynamic bid data structure is operable to analyze the content to determine, based a comparison of said indication of the bid amount with at least one other indication of another bid amount that another advertiser is willing to pay to present another specified advertising message with the search response, whether to present the specified advertising message with a search response to be sent in response to the pending search request.

40. The data communications network of claim 39 wherein the dynamic bid data structure further comprises a hyperlink to be associated with the presented advertising message.

41. The data communications network of claim 39 wherein the dynamic bid data structure further comprises information specifying that the dynamic bid represented by the dynamic bid data structure should be cached by the publisher computing device and applied to similar search requests received in the future.

42. The data communications network of claim 39 wherein the dynamic bid data structure further comprises data comprising a rich media element.

43. The communications network data of claim 39 wherein the dynamic bid data structure further comprises a reference to a rich media element.

44. The data communications network of claim 39 wherein the dynamic bid data structure further comprises an identifier of the advertiser.

45. The data communications network of claim 39 wherein the dynamic bid data structure further comprises an identifier of a notification received by the advertiser regarding the search request.

46. The data communications network of claim 39 wherein the dynamic bid data structure further comprises an identifier of the dynamic bid represented by the dynamic bid data structure.

47. The data communications network of claim 39 wherein the generated data signals convey the dynamic bid data structure using authenticated communications.

48. The data communications network of claim 39 wherein the information specifying an advertising message is in textual format.

49. The data communications network of claim 39 wherein the information specifying an advertising message is in binary format.

50. A method in a computing system for considering on a pending advertising opportunity, comprising:

receiving at at least one advertiser computing device a notification from a publisher containing keywords relating to a content request received by the publisher, the notification being sent by the publisher to the advertiser computing device and at least one other advertiser computing device between receipt of the content request by the publisher and dispatch of a content response responsive to the content request by the publisher; and in response to receiving the notification, sending to the publisher, prior to exhaustion of available advertising opportunities in connection with the content, a dynamic advertising directive specifying an advertising message to present in connection with a content response responsive to the content request.

51. The method of claim 50 wherein the dynamic advertising directive further specifies to present in connection with a content response responsive to the content request.

52. The method of claim 50 wherein the advertising message specified by the dynamic advertising directive identifies and promotes the advertiser of which the notification is received.

* * * * *